US012377586B2

(12) United States Patent
Utsumi (10) Patent No.: US 12,377,586 B2
(45) Date of Patent: Aug. 5, 2025

(54) INJECTION MOLDING MACHINE

(71) Applicant: THE JAPAN STEEL WORKS, LTD., Tokyo (JP)

(72) Inventor: Satoshi Utsumi, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 96 days.

(21) Appl. No.: 18/575,103

(22) PCT Filed: Jun. 24, 2022

(86) PCT No.: PCT/JP2022/025311
§ 371 (c)(1),
(2) Date: Dec. 28, 2023

(87) PCT Pub. No.: WO2023/276881
PCT Pub. Date: Jan. 5, 2023

(65) Prior Publication Data
US 2024/0424721 A1 Dec. 26, 2024

(30) Foreign Application Priority Data
Jun. 29, 2021 (JP) .................................. 2021-107202

(51) Int. Cl.
*B29C 45/07* (2006.01)
*B29C 45/17* (2006.01)
(Continued)

(52) U.S. Cl.
CPC .......... *B29C 45/1773* (2013.01); *B29C 45/07* (2013.01); *B29C 45/1761* (2013.01);
(Continued)

(58) Field of Classification Search
CPC ........................... B29C 45/1773; B29C 45/07
See application file for complete search history.

(56) References Cited

U.S. PATENT DOCUMENTS 4,699,581 A * 10/1987 Nagasaka ........... B29C 45/5008
425/574
6,322,343 B1 * 11/2001 Yoda ....................... B29C 45/17
425/150
(Continued)

FOREIGN PATENT DOCUMENTS

CN 113733457 A * 12/2021 ......... B29C 45/1756
JP 9-66543 A 11/1997
(Continued)

OTHER PUBLICATIONS

International Search Report (PCT/IDS/210) dated Aug. 16, 2022, issued by the International Searching Authority in counterpart International Application No. PCT/JP2022/025311.
(Continued)

*Primary Examiner* — Atul P. Khare
(74) *Attorney, Agent, or Firm* — Sughrue Mion, PLLC (57) ABSTRACT

An injection molding machine (1) including: a bed (B); an injection device (3) provided to be movable with respect to the bed (B); a mold clamping device (2) provided on the bed (B); and a movement device (5) configured to move the injection device (3), in which the movement device (5) includes a hydraulic cylinder and a hydraulic pump for supplying a working fluid to the hydraulic cylinder, and the hydraulic pump is provided inside the bed (B).

13 Claims, 4 Drawing Sheets

(51) Int. Cl.
  *B29C 45/50* (2006.01)
  *B29C 45/82* (2006.01)

(52) U.S. Cl.
  CPC ...... *B29C 45/1777* (2013.01); *B29C 45/5008* (2013.01); *B29C 45/82* (2013.01); *B29C 2045/1785* (2013.01); *B29C 2945/76785* (2013.01)

(56) References Cited

U.S. PATENT DOCUMENTS

2011/0189333 A1* 8/2011 Grunitz ................ F15B 21/065
  91/459
2019/0193313 A1* 6/2019 Miyaki .................. B29C 45/06

FOREIGN PATENT DOCUMENTS

| JP | H10128784 A | * | 5/1998 | ......... B29C 45/1773 |
| JP | 2000-185347 A | | 7/2000 | |
| JP | 2003-291174 A | | 10/2003 | |
| JP | 2009255476 A | | 11/2009 | |
| JP | 2011-161919 A1 | | 8/2011 | |
| JP | 2013-231389 A | | 11/2013 | |
| JP | 2019-111734 A | | 7/2019 | |

OTHER PUBLICATIONS

International Written Opinion (PCT/IDS/237) dated Aug. 16, 2022, issued by the International Searching Authority in counterpart International Application No. PCT/JP2022/025311.

* cited by examiner

INJECTION MOLDING MACHINE

CROSS-REFERENCE TO RELATED APPLICATIONS

This application is a National Phase Entry of PCT International Application No. PCT/JP2022/025311, filed on Jun. 24, 2022, which claims priority to Japanese Patent Application No. 2021-107202 filed on Jun. 29, 2021, which is incorporated herein in its entirety by reference.

TECHNICAL FIELD

The present invention relates to an injection molding machine including an injection device provided to be movable on a bed, a mold clamping device provided on the bed, and a movement device for moving the injection device toward and away from the mold clamping device.

BACKGROUND ART

In a transverse injection molding machine, each device is provided on a bed. That is, an injection device is provided to be movable on the bed, and a mold clamping device is provided on the bed. For example, as described in Patent Literature 1, the injection device includes a nozzle touch device, that is, a movement device. The movement device includes an oil hydraulic cylinder, and when pressure oil is supplied to the oil hydraulic cylinder, the injection device moves. Accordingly, the injection device is moved toward or away from the mold clamping device.

CITATION LIST

Patent Literature

Patent Literature 1: JP2009-255476A

SUMMARY OF INVENTION

Technical Problem

An injection molding machine includes one or more control panels for driving each device. Such a control panel is provided below an injection device in a bed. A movement device includes an oil hydraulic pump for supplying pressure oil to the oil hydraulic cylinder, a motor configured to drive the oil hydraulic pump, and the like. The oil hydraulic pump and the like causes a failure when a control panel and the like is contaminated due to leakage of the pressure oil, and therefore, it is necessary to consider an installation location of the oil hydraulic pump and the like. That is, it is not preferable to place the oil hydraulic pump and the like on the bed. Accordingly, the oil hydraulic pump and the like of the movement device is provided on a lateral side of the bed. There is a problem that the oil hydraulic pump protrudes from the lateral side of the bed, and the appearance is impaired.

In view of the above problems, an object of the present disclosure is to provide an injection molding machine that does not impair the appearance.

Other problems and novel features will become apparent from description of the present description and the accompanying drawings.

Solution to Problem

The present inventors have found that the above problem can be solved by providing a hydraulic pump in a bed. The hydraulic pump supplies a working fluid to a hydraulic cylinder of a movement device.

A solution to the above problem is as follows.

[1]
An injection molding machine includes:
a bed;
an injection device provided to be movable with respect to the bed;
a mold clamping device provided on the bed; and
a movement device configured to move the injection device,
in which the movement device includes a hydraulic cylinder and a hydraulic pump configured to supply a working fluid to the hydraulic cylinder, and
in which the hydraulic pump is provided inside the bed.

[2]
The injection molding machine according to [1], in which a motor configured to drive the hydraulic pump and a tank configured to store a working fluid of the hydraulic pump are also provided inside the bed.

[3]
The injection molding machine according to [1] or [2], in which the hydraulic cylinder is attached to the injection device.

[4]
The injection molding machine according to any one of [1] to [3], in which the hydraulic pump is provided on a mold clamping device side in the bed.

[5]
The injection molding machine according to [4], in which a motor configured to drive the hydraulic pump and a tank configured to store a working fluid of the hydraulic pump are also provided on the mold clamping device side in the bed.

[6]
The injection molding machine according to any one of [1] to [5], in which the hydraulic pump is fixed in the bed by fixing means, and is configured to be rotated horizontally when a portion of the fixing means is removed.

[7]
The injection molding machine according to any one of [1] to [3], in which a first space in which a control panel and a transformer are provided is secured below the injection device in the bed, and the hydraulic pump is provided in a second space adjacent to a mold clamping device side of the first space.

[8]
The injection molding machine according to [7], in which a motor configured to drive the hydraulic pump and a tank configured to store a working fluid of the hydraulic pump are also provided in the second space.

[9]
The injection molding machine according to [7] or [8], in which an oil leakage prevention wall is provided between the first space and the second space.

[10]
The injection molding machine according to any one of [3] to [5],
in which a hydraulic pipe connecting the hydraulic pump and the hydraulic cylinder includes a first curved portion which is allowed to curve, a linear portion which is connected to the first curved portion and is maintained in a linear shape, and a second curved portion which is connected to the linear portion and is allowed to curve, and in which the first curved portion is disposed on a mold clamping device side, and the linear portion is disposed closer to the mold clamping device on an injection device side.

[11]

The injection molding machine according to [10], in which the first curved portion is disposed in the bed, and the second curved portion is disposed above the bed.

[12]

The injection molding machine according to [10] or [11], in which the linear portion is disposed above the bed.

[13]

The injection molding machine according to [12], in which the linear portion is covered with a cover.

Advantageous Effects of Invention

According to the present disclosure, it is possible to provide an injection molding machine in which a hydraulic pump is housed in a bed and the appearance is not impaired.

DESCRIPTION OF EMBODIMENTS

Hereinafter, a specific embodiment will be described in detail with reference to the drawings. However, the present invention is not limited to the following embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present embodiment will be described.

<Injection Molding Machine>

An injection molding machine according to an embodiment of the present invention includes:
a bed;
an injection device provided to be movable with respect to the bed;
a mold clamping device provided on the bed; and
a movement device configured to move the injection device.
in which the movement device includes a hydraulic cylinder and a hydraulic pump configured to supply a working fluid to the hydraulic cylinder, and
in which the hydraulic pump is provided inside the bed.

In the following description using the drawings, an oil hydraulic cylinder and an oil hydraulic pump are used as the hydraulic cylinder and the hydraulic pump, respectively.

Figure 1:
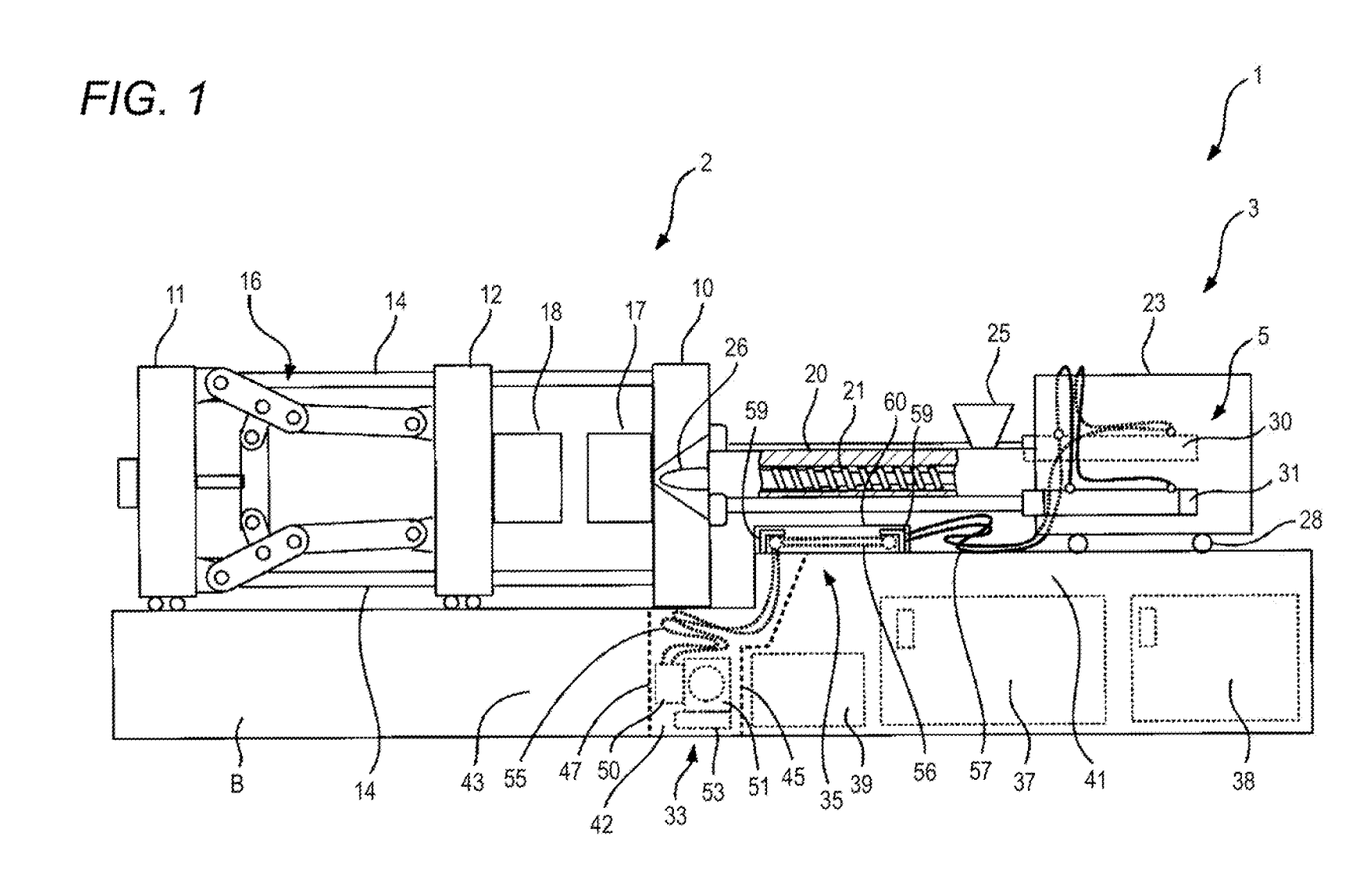
FIG. 1 is a front view showing an injection molding machine according to the present embodiment.
Figure 2:
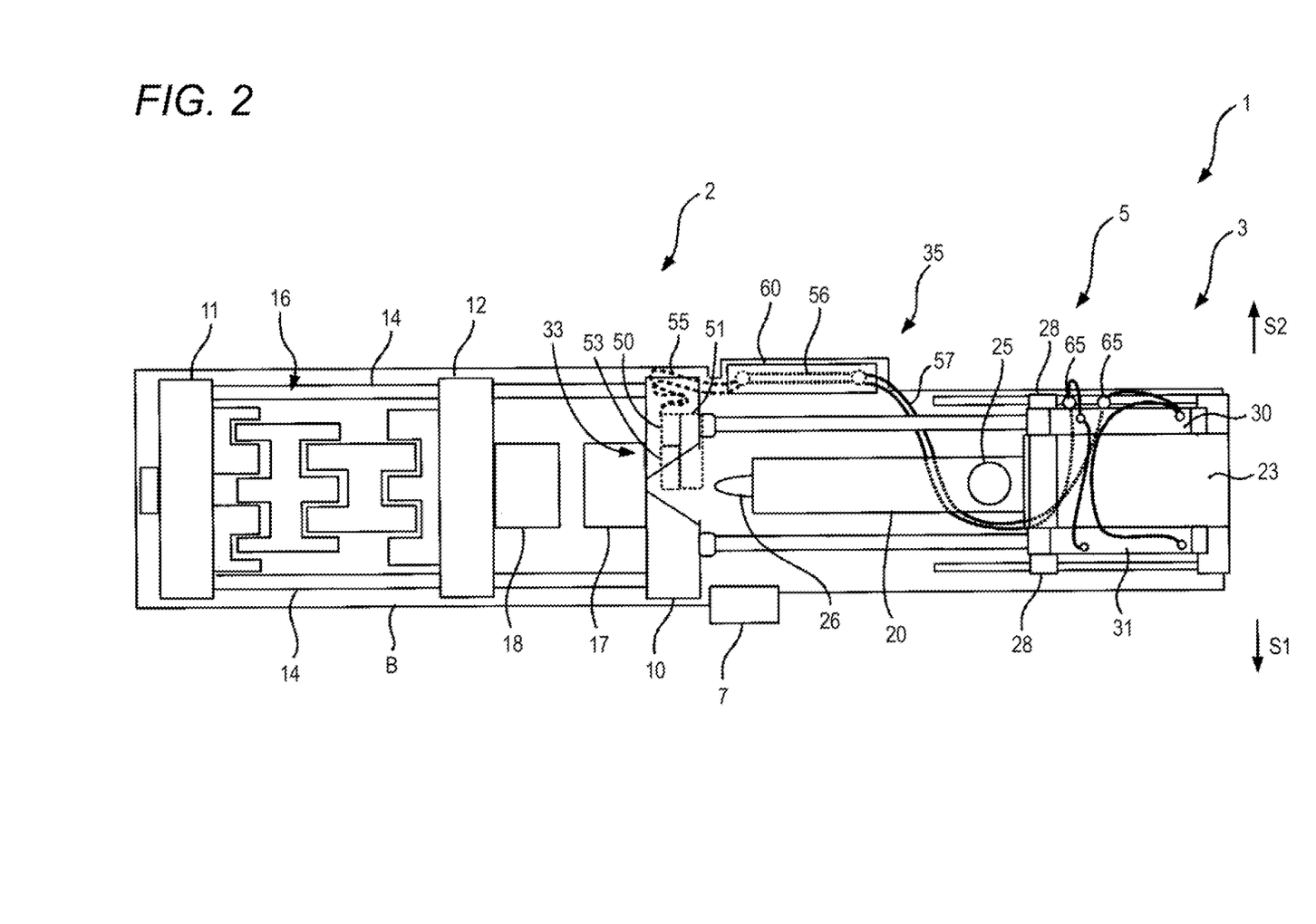
FIG. 2 is a top view showing the injection molding machine according to the present embodiment.

As shown in FIGS. 1 and 2, an injection molding machine 1 according to the present embodiment includes a mold clamping device 2 placed on a bed B, and an injection device 3 provided on the bed B. The injection molding machine 1 is provided with a nozzle touch device, that is, a movement device 5, which will be described in detail later, and which is configured to cause the injection device 3 to be moved toward or away from the mold clamping device 2. In the present embodiment, the mold clamping device 2 and the injection device 3 are driven by an electric servo motor or the like. That is, the injection molding machine 1 according to the present embodiment is a so-called electric injection molding machine.

As shown in FIG. 2, the injection molding machine 1 includes a controller 7. In FIG. 1, the controller 7 is not shown to avoid complication of the drawing. The controller 7 is configured to control the mold clamping device 2, the injection device 3, and the like. As shown in FIG. 2, of both sides of the injection molding machine 1, a side on which the controller 7 is provided is referred to as an operation side S1, and an opposite side is referred to as a counter operation side S2. FIG. 1 is a front view of the injection molding machine 1 viewed from the operation side S1.

<Mold Clamping Device>

The injection molding machine according to the embodiment of the present invention includes a mold clamping device provided on a bed.

As shown in FIG. 1, the mold clamping device 2 includes a fixed platen 10 fixed on the bed B, a mold clamping housing 11 slidable on the bed B, and a movable platen 12 also slidable on the bed B. The fixed platen 10 and the mold clamping housing 11 are connected by a plurality of, for example, four tie bars 14, 14 . . . . The movable platen 12 is slidable between the fixed platen 10 and the mold clamping housing 11. A mold clamping mechanism 16 configured by a toggle mechanism is provided between the mold clamping housing 11 and the movable platen 12. Incidentally, the mold clamping mechanism 16 may be a direct-pressure type mold clamping cylinder. The fixed platen 10 and the movable platen 12 are provided with a fixed side mold 17 and a movable side mold 18, respectively. The molds are opened and closed when the mold clamping mechanism 16 is driven by an electric servo motor (not shown).

<Injection Device>

The injection molding machine according to the embodiment of the present invention includes an injection device provided to be movable with respect to a bed.

As shown in FIG. 1, the injection device 3 includes a heating cylinder 20, a screw 21 inserted in the heating cylinder 20, and a screw driving device 23 for driving the screw 21. The heating cylinder 20 is provided with a hopper 25 and an injection nozzle 26. When the screw 21 is rotated and a resin material is supplied from the hopper 25, the resin material is melted and metered in the heating cylinder 20. When the screw 21 is driven in an axial direction, the molten resin is injected from the injection nozzle 26.

As shown in FIG. 2, the injection device 3 is provided on the bed B via a pair of linear guides 28, 28. That is, the injection device 3 is movably placed on the bed B. The injection device 3 is moved by the movement device 5 described below.

<Movement Device>

The injection molding machine according to the embodiment of the present invention includes a movement device configured to move an injection device. The movement device includes a hydraulic cylinder and a hydraulic pump that supplies a working fluid to the hydraulic cylinder.

In the embodiment of the present invention, the hydraulic cylinder is preferably attached to the injection device.

As shown in FIGS. 1 and 2, the movement device 5 according to the present embodiment includes a pair of oil hydraulic cylinders 30 and 31, a pressure oil supply unit 33 configured to supply pressure oil to the oil hydraulic cylinders 30 and 31, and an oil hydraulic pipe 35 that connects the pressure oil supply unit 33 and the oil hydraulic cylinders 30 and 31. The pair of oil hydraulic cylinders 30 and 31 are provided parallel to the heating cylinder 20 and on both sides of the heating cylinder 20. One end portion of the oil hydraulic cylinder, that is, a rod, is fixed to the fixed platen 10, and the other end portion of the oil hydraulic cylinder is fixed to the screw driving device 23 provided in the injection device 3. Therefore, when the pressure oil is supplied to the oil hydraulic cylinders 30 and 31, the injection device 3 approaches the mold clamping device 2, and the injection nozzle 26 touches the fixed side mold 17. Alternatively, the injection device 3 is separated from the mold clamping device 2.

<Pressure Oil Supply Unit>

In the injection molding machine according to the embodiment of the present invention, a hydraulic pump is provided in a bed. Preferably, the injection molding machine may include a motor for driving the hydraulic pump and a tank for storing a working fluid of the hydraulic pump, and the motor for driving the hydraulic pump and the tank for storing the working fluid of the hydraulic pump may also be provided in the bed.

Figure 3:
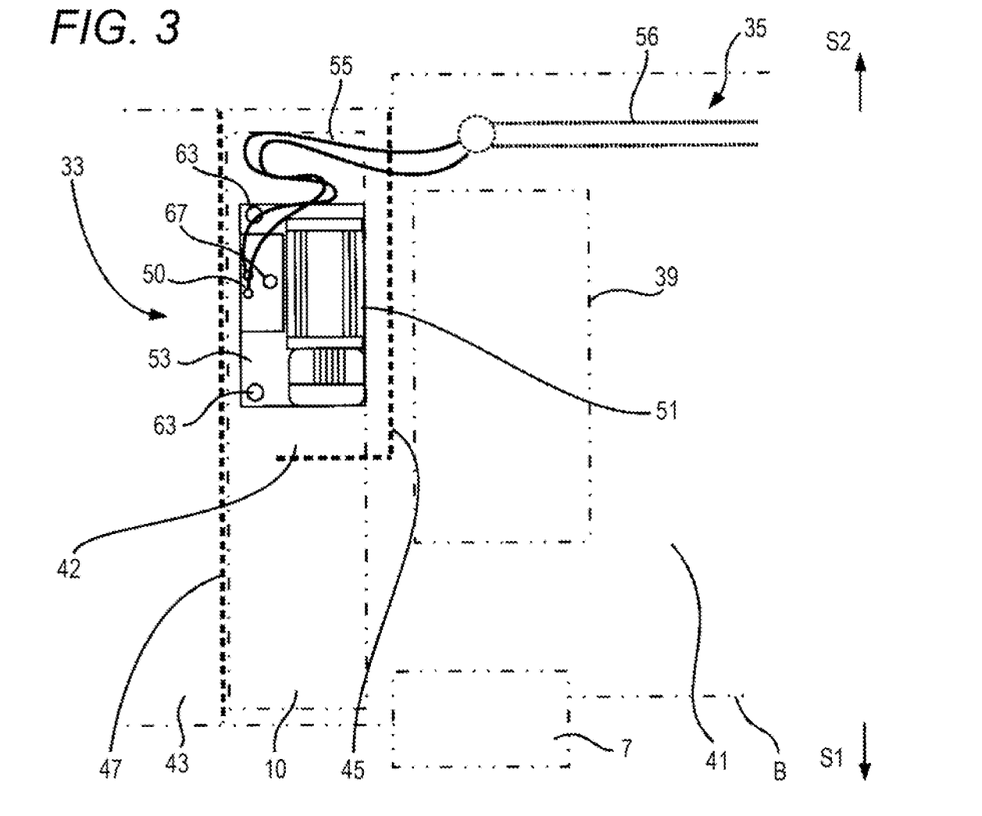
FIG. 3 is a top view showing a part of the injection molding machine according to the present embodiment and a pressure oil supply unit constituting a movement device.

As shown in FIGS. 1, 2, and 3, the pressure oil supply unit 33 includes an oil hydraulic pump 50, an electric motor 51 configured to drive the oil hydraulic pump 50, and a tank 53 for storing pressure oil. Further, the pressure oil supply unit 33 also includes a hydraulic device necessary for supplying the pressure oil, such as an electromagnetic valve, but it is not shown in the drawing. The pressure oil supply unit 33 can be made compact because devices and hydraulic devices necessary for supplying the pressure oil are integrally coupled.

In the injection molding machine according to the embodiment of the present invention, the hydraulic pump is preferably provided on a mold clamping device side in the bed, and the motor for driving the hydraulic pump and the tank for storing the working fluid of the hydraulic pump are more preferably provided on the mold clamping device side in the bed.

In the injection molding machine according to the embodiment of the present invention, it is also preferable that a first space in which the control panel and a transformer are provided is secured below the injection device in the bed, and the hydraulic pump is provided in a second space adjacent to the mold clamping device side of the first space. It is preferable that the motor for driving the hydraulic pump and the tank for storing the working fluid of the hydraulic pump are also provided in the second space.

Further, an oil leakage prevention wall is preferably provided between the first space and the second space.

The movement device 5 according to the present embodiment is characterized in that the pressure oil supply unit 33 is provided in the bed B. As shown in FIG. 1, a ceiling of the bed B is higher on a side of the injection device 3 and lower on a side of the mold clamping device 2. Control panels 37 and 38 for controlling each device are provided in the bed B on the side of the injection device 3 which is higher. A transformer 39 is provided adjacent to the control panels 37 and 38 as necessary. This is because when the injection molding machine 1 is used in a country or region where the voltage is different, the voltage is transformed to a standard voltage, for example, 200 V. Accordingly, there is no room below the injection device 3 in the bed B, that is, in the first space 41, and the pressure oil supply unit 33 cannot be disposed.

Therefore, the pressure oil supply unit 33 is disposed in the second space 42 adjacent to the first space 41. The second space 42 is located on the side of the mold clamping device 2 in the bed B, more specifically, below the fixed platen 10. Note that a third space 43 between the fixed platen 10 and the movable platen 12 in the bed B needs to be secured for a user because the user may provide a chute for taking out a molded product, a temperature control device for the mold, and the like. Accordingly, the pressure oil supply unit 33 is provided in the narrow second space 42 sandwiched between the first space 41 and the third space 43. As shown in FIGS. 1 and 3, an oil leakage prevention wall 45 is provided between the first space 41 and the second space 42 to protect devices in the first space 41 from being contaminated by the pressure oil. A partition wall 47 is provided between the second space 42 and the third space 43.

The pressure oil supply unit 33 is disposed in the second space 42 as described above, and is also provided closer to the counter operation side S2 of the injection molding machine 1. This is because the oil hydraulic pipe 35 to be described below is provided on the counter operation side S2, and the oil hydraulic pipe 35 does not interfere with an operation by the user.

In the embodiment of the present invention, it is preferable that the hydraulic pump is fixed in the bed by fixing means, and is rotated horizontally when a portion of the fixing means is removed.

As shown in FIG. 3, the pressure oil supply unit 33 is fixed to a floor surface of the bed B by two fixing means, that is, fixing bolts 63, 63. Therefore, as will be explained later, when one fixing bolt 63 is removed, the pressure oil supply unit 33 can be rotated around the remaining fixing bolt 63.

<Oil Hydraulic Pipe>

The injection molding machine according to the embodiment of the present invention includes a hydraulic pipe that connects a hydraulic pump and a hydraulic cylinder. It is preferable that the hydraulic pipe connecting the hydraulic pump and the hydraulic cylinder may include a first curved portion which is allowed to curve, a linear portion which is connected to the first curved portion and is maintained in a linear shape, and a second curved portion which is connected to the linear portion and is allowed to curve. The first curved portion may be disposed on the mold clamping device side, and the linear portion may be disposed closer to the mold clamping device on the injection device side.

Further, it is preferable that the first curved portion may be disposed in the bed, the second curved portion may be disposed above the bed, and the linear portion may be disposed above the bed.

The linear portion is preferably covered with a cover.

The oil hydraulic pipe 35 includes a pair of pipe lines provided in parallel. When pressure oil is supplied from one pipe line, the pressure oil is returned from the other pipe line, and when pressure oil is supplied from the other pipe line, the pressure oil is returned from the one pipe line. As shown in FIG. 2, such an oil hydraulic pipe 35 is provided on the counter operation side S2 as a whole and is divided into three portions. Specifically, as shown in FIGS. 1 and 2, the oil hydraulic pipe 35 is divided into a first curved portion 55 connected to the pressure oil supply unit 33, a linear portion 56 connected to the first curved portion 55, and a second curved portion 57 connecting the linear portion 56 and the pair of oil hydraulic cylinders 30 and 31.

The first curved portion 55 and the second curved portion 57 of the oil hydraulic pipe 35 are formed of a flexible pipe, that is, a flexible pipe line, so that a change in the curvature is allowed. That is, the pipe can be freely curved. The first curved portion 55 is disposed in the bed B and is connected to the pressure oil supply unit 33 as described above. The second curved portion 57 is disposed above the bed B.

As shown in FIG. 2, the second curved portion 57 protrudes from the linear portion 56 disposed on the counter operation side S2, is curved by largely protruding above the bed B toward the operation side S1, and then is connected to connector portions 65, 65 provided on the counter operation side S2. The connector portions 65, 65 are connected to the pair of oil hydraulic cylinders 30 and 31. As will be described later, when the injection device 3 is moved, this largely protruding and curved portion is curved.

In contrast to the first curved portion 55 and the second curved portion 57, the linear portion 56 is formed of a straight pipe. The linear portion 56 can be disposed above the bed B. In the embodiment shown in FIG. 1, the linear portion 56 is provided above the bed B. When the linear portion 56 is disposed above the bed B as described above, the linear portion 56 is preferably formed of a flexible pipe. As shown in FIG. 1, the linear portion 56 is fixed to the bed B by fixing devices 59, 59, and is further covered with a cover 60. During maintenance such as replacement of the tie bars 14, 14, the cover 60 is removed and the fixing devices 59, 59 are removed. When the linear portion 56 is formed of a flexible pipe, the linear portion 56 can be temporarily curved and retracted laterally from the bed B, which does not hinder maintenance.

On the other hand, although not shown in the drawing, the linear portion 56 may be disposed in the bed B. In this case, the linear portion 56 does not become an obstacle during maintenance such as replacement of the tie bars 14, 14. Therefore, the linear portion 56 can also be formed of a rigid pipe, for example, a metal pipe. Incidentally, in the case where the linear portion 56 is disposed in the bed B, it is preferable to provide an oil leakage cover for protection so as not to contaminate the control panels 37 and 38 and the transformer 39 when the pressure oil leaks.

Figure 4:
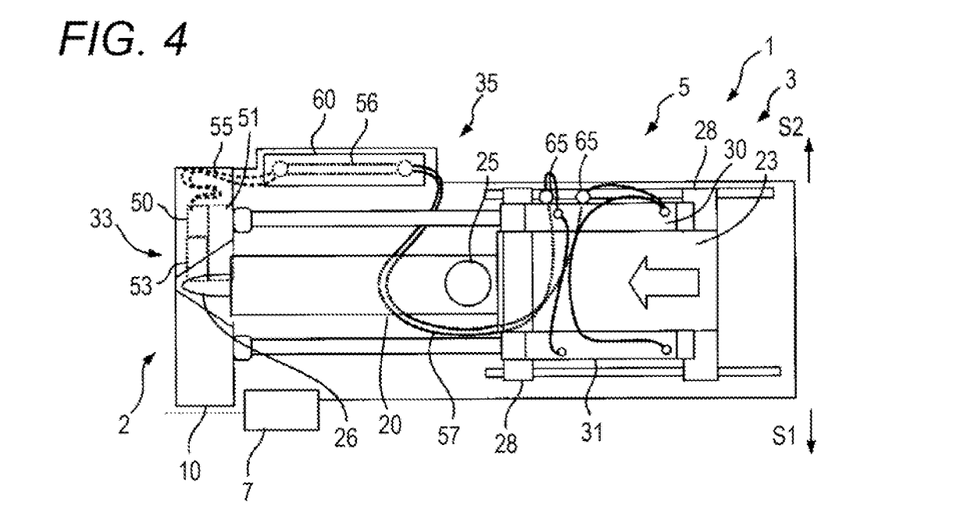
FIG. 4 is a top view showing a part of the injection molding machine according to the present embodiment.

In the injection molding machine 1 according to the present embodiment, when the injection device 3 is moved by the movement device 5, the curvature of the oil hydraulic pipe 35 changes in the second curved portion 57. FIG. 2 shows a state when the injection device 3 is separated from the mold clamping device 2, and FIG. 4 shows a state when the injection device 3 is brought close to the mold clamping device 2. As shown in FIGS. 2 and 4, the oil hydraulic pipe 35 is freely curved in the second curved portion 57 to support the movement of the injection device 3.

Figure 5:
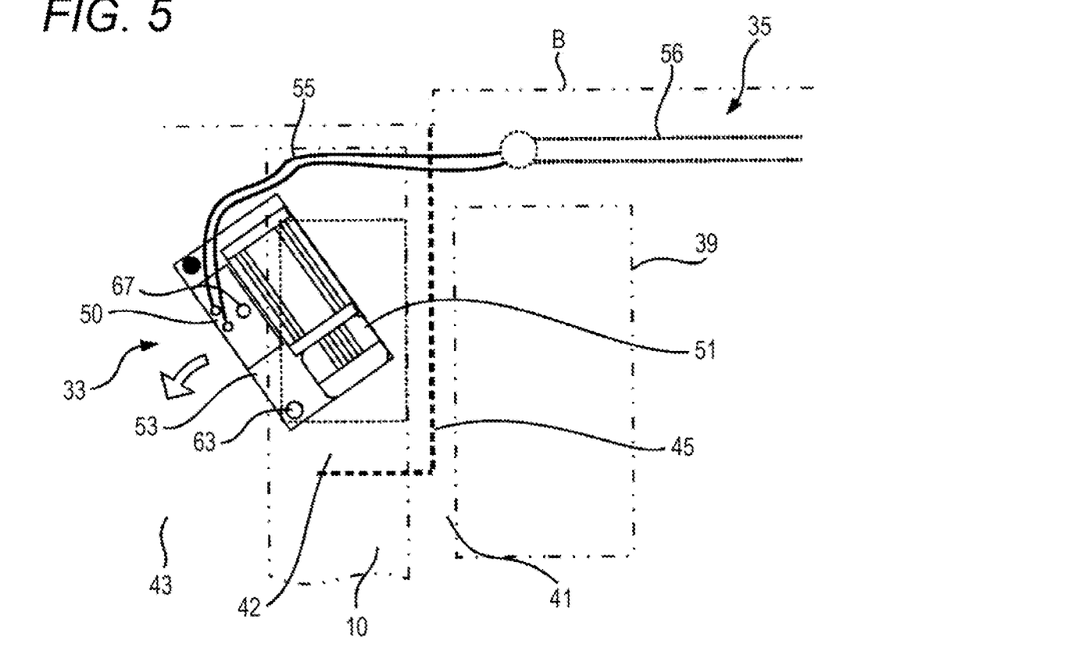
FIG. 5 is a top view showing a part of the injection molding machine according to the present embodiment and the pressure oil supply unit constituting the movement device.

In the movement device according to the present embodiment, maintenance such as replacement of the pressure oil in the pressure oil supply unit 33 is performed as follows. First, the partition wall 47 (see FIG. 3) is removed from the bed B. Then, one of the fixing bolts 63, 63 is removed. In this way, the pressure oil supply unit 33 can be rotated in a horizontal direction. FIG. 5 shows a state in which the pressure oil supply unit 33 is rotated. When the pressure oil supply unit 33 is rotated, the first curved portion 55 extends to support the rotation. When the pressure oil supply unit 33 is rotated, an oil supply port 67 for pressure oil exchange is exposed to the third space 43 side. The pressure oil is exchanged. The pressure oil supply unit 33 is rotated to return to an original position and fixed by the fixing bolt 63. The partition wall 47 (see FIG. 3) is attached. The maintenance is completed.

<Injection Molding Machine According to Related Art>

Figure 6:
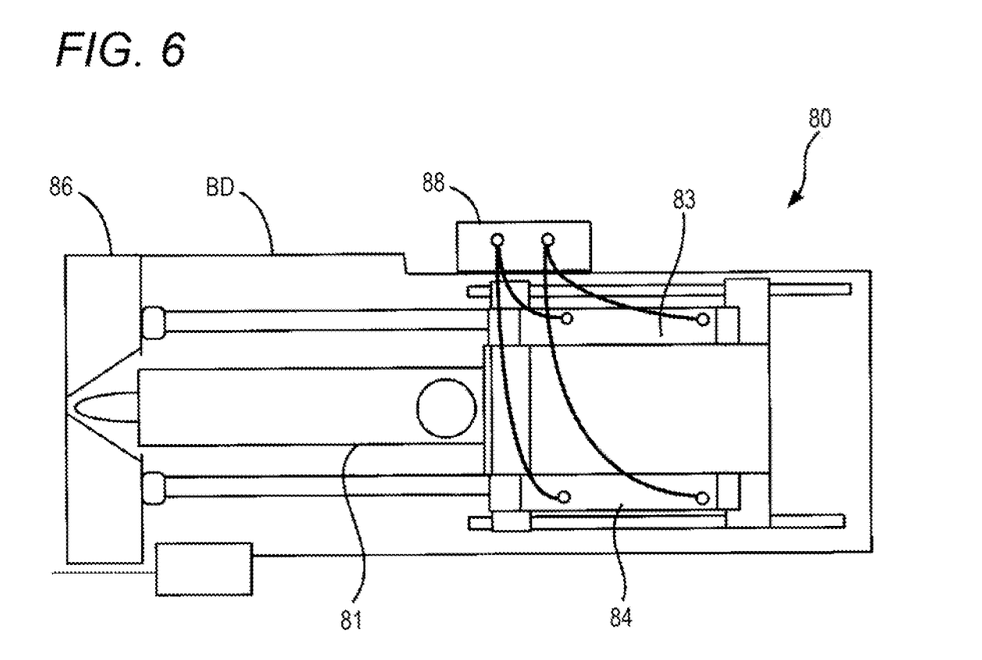
FIG. 6 is a top view showing a part of an injection molding machine in the related art.

FIG. 6 shows a part of an injection molding machine 80 according to the related art. In the injection molding machine 80, an injection device 81 moves toward or away from a fixed platen 86 by a pair of oil hydraulic cylinders 83 and 84. In the injection molding machine 80 in the related art, a pressure oil supply unit 88 that supplies pressure oil to the oil hydraulic cylinders 83 and 84 is disposed on a side of a bed BD. As a result, the appearance is impaired. Further, since the pressure oil supply unit 88 protrudes toward the side of the bed BD, there is a risk that a user may trip or bump into the pressure oil supply unit 88. On the contrary, in the injection molding machine 1 (see FIGS. 1 and 2) according to the present embodiment, the pressure oil supply unit 33 is provided in the bed B as described above. Therefore, the appearance is not impaired and there is no danger to the user.

Modifications of Present Embodiment

Various modifications are possible for the injection molding machine 1 according to the present embodiment. For example, in the present embodiment, the movement device 5 (see FIGS. 1 and 2) is described as having the oil hydraulic cylinders 30 and 31 which are supplied with the pressure oil. However, it may be driven by a type of a working fluid other than the pressure oil. That is, the movement device 5 may include a hydraulic cylinder, a hydraulic pump for supplying a working fluid to the hydraulic cylinder, and the like.

Although the invention made by the present inventors is specifically described based on the embodiment, it is needless to say that the present invention is not limited to the embodiment described above, and various modifications can be made without departing from the scope of the invention. The plurality of examples described above may be appropriately combined.

INDUSTRIAL APPLICABILITY

In the injection molding machine according to the embodiment of the present invention, the hydraulic pump is housed in a bed and the appearance is not impaired.

Although the present invention has been described in detail with reference to a specific embodiment, it will be apparent to those skilled in the art that various changes and modifications can be made without departing from the spirit and scope of the present invention.

REFERENCE SIGNS LIST

1 Injection molding machine
2 Mold clamping device
3 Injection device
5 Movement device
7 Controller
10 Fixed platen
11 Mold clamping housing
12 Movable platen
14 Tie bar
16 Mold clamping mechanism
17 Fixed side mold
18 Movable side mold
20 Heating cylinder
21 Screw 23 Screw driving device
25 Hopper
26 Injection nozzle
28 Linear guide
30 Oil hydraulic cylinder
31 Oil hydraulic cylinder
33 Pressure oil supply unit
35 Oil hydraulic pipe
37 Control panel
38 Control panel
39 Transformer
41 First space
42 Second space
43 Third space
45 Oil leakage prevention wall
47 Partition wall
50 Oil hydraulic pump
51 Electric motor
53 Tank
55 First curved portion
56 Linear portion
57 Second curved portion
59 Fixing device
60 Cover
63 Fixing bolt
65 Connector portion
67 Oil supply port
S1 Operation side
S2 Counter operation side
B Bed
80 Injection molding machine
81 Injection device
83 Oil hydraulic cylinder
84 Oil hydraulic cylinder
86 Fixed platen
88 Pressure oil supply unit
BD Bed

The invention claimed is:

1. An injection molding machine comprising:
a bed;
an injection device provided to be movable with respect to the bed;
a mold clamping device provided on the bed; and
a movement device configured to move the injection device,
wherein the movement device includes a hydraulic cylinder and a hydraulic pump configured to supply a working fluid to the hydraulic cylinder,
wherein the hydraulic pump is provided inside the bed, and
wherein the hydraulic pump is fixed in the bed by fixing means, and is configured to be rotated horizontally when a portion of the fixing means is removed.

2. The injection molding machine according to claim 1, wherein a motor configured to drive the hydraulic pump and a tank configured to store the working fluid supplied by the hydraulic pump are integrally coupled with the hydraulic pump.

3. The injection molding machine according to claim 1, wherein the hydraulic cylinder is attached to the injection device.

4. The injection molding machine according to claim 3, further comprising a hydraulic pipe connecting the hydraulic pump and the hydraulic cylinder, the hydraulic pipe including a first curved portion, a linear portion which is connected to the first curved portion, and a second curved portion which is connected to the linear portion,
wherein the first curved portion is disposed on a side of the hydraulic pipe corresponding to the mold clamping device, and the linear portion is disposed closer to the mold clamping device, with respect to the first curved portion, on a side of the hydraulic pipe corresponding to the injection device.

5. The injection molding machine according to claim 4, wherein the first curved portion is disposed in the bed, and the second curved portion is disposed above the bed.

6. The injection molding machine according to claim 4, wherein the linear portion is disposed above the bed.

7. The injection molding machine according to claim 6, wherein the linear portion is covered with a cover.

8. The injection molding machine according to claim 1, wherein the hydraulic pump is provided in a side of the bed corresponding to the mold clamping device.

9. The injection molding machine according to claim 8, wherein a motor configured to drive the hydraulic pump and a tank configured to store the working fluid supplied by the hydraulic pump are integrally coupled with the hydraulic pump and are also provided in a side of the bed corresponding to the mold clamping device.

10. The injection molding machine according to claim 1, wherein the fixing means comprises fixing bolts.

11. The injection molding machine according to claim 1, wherein a first space in which a control panel and a transformer are provided is secured below the injection device in the bed, and the hydraulic pump is provided in a second space adjacent to a side of the first space corresponding to the mold clamping device.

12. The injection molding machine according to claim 11, wherein a motor configured to drive the hydraulic pump and a tank configured to store the working fluid supplied by the hydraulic pump are integrally coupled with the hydraulic pump and are also provided in the second space.

13. The injection molding machine according to claim 11, wherein an oil leakage prevention wall is provided between the first space and the second space.

* * * * *